US011247367B2

(12) United States Patent
Gunner et al.

(10) Patent No.: US 11,247,367 B2
(45) Date of Patent: *Feb. 15, 2022

(54) 3D-PRINTED TOOLING SHELLS

(71) Applicant: DIVERGENT TECHNOLOGIES, INC., Los Angeles, CA (US)

(72) Inventors: Jon Paul Gunner, Los Angeles, CA (US); Narender Shankar Lakshman, Los Angeles, CA (US)

(73) Assignee: DIVERGENT TECHNOLOGIES, INC., Los Angeles, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/884,808

(22) Filed: May 27, 2020

(65) Prior Publication Data

US 2020/0290241 A1 Sep. 17, 2020

Related U.S. Application Data

(63) Continuation of application No. 15/430,395, filed on Feb. 10, 2017, now Pat. No. 10,759,090.

(51) Int. Cl.
| | | |
|---|---|---|
| *B33Y 10/00* | (2015.01) | |
| *B29C 33/38* | (2006.01) | |
| *B29C 70/48* | (2006.01) | |
| *B22F 5/00* | (2006.01) | |
| *B29K 105/08* | (2006.01) | |
| *B29K 307/04* | (2006.01) | |
| *B29C 70/40* | (2006.01) | |
| *C22C 49/14* | (2006.01) | |
| *C22C 1/04* | (2006.01) | |
| *B22F 10/20* | (2021.01) | |

(52) U.S. Cl.
CPC .......... *B29C 33/3842* (2013.01); *B22F 5/007* (2013.01); *B22F 10/20* (2021.01); *B22F 2203/05* (2013.01); *B22F 2999/00* (2013.01); *B29C 70/40* (2013.01); *B29C 70/48* (2013.01); *B29K 2105/0872* (2013.01); *B29K 2307/04* (2013.01); *B29K 2905/12* (2013.01); *B33Y 10/00* (2014.12); *C22C 1/0433* (2013.01); *C22C 49/14* (2013.01)

(58) Field of Classification Search
CPC ..... B29C 33/3842; B29C 70/40; B29C 70/48; B22F 10/20; B22F 2999/00; B22F 2203/05; B22F 5/007; C22C 1/0433; B33Y 10/00; B29K 2105/0872; B29K 2905/12; B29K 2307/04; Y02P 10/25
USPC ....................................................... 264/511
See application file for complete search history.

(56) References Cited

U.S. PATENT DOCUMENTS

| | | |
|---|---|---|
| 5,203,226 A | 4/1993 | Hongou et al. |
| 5,742,385 A | 4/1998 | Champa |
| 5,990,444 A | 11/1999 | Costin |
| 6,010,155 A | 1/2000 | Rinehart |
| 6,096,249 A | 8/2000 | Yamaguchi |
| 6,140,602 A | 10/2000 | Costin |
| 6,250,533 B1 | 6/2001 | Otterbein et al. |
| 6,252,196 B1 | 6/2001 | Costin et al. |
| 6,318,642 B1 | 11/2001 | Goenka et al. |
| 6,354,361 B1 | 3/2002 | Sachs et al. |
| 6,365,057 B1 | 4/2002 | Whitehurst et al. |
| 6,391,251 B1 | 5/2002 | Keicher et al. |
| 6,409,930 B1 | 6/2002 | Whitehurst et al. |
| 6,468,439 B1 | 10/2002 | Whitehurst et al. |
| 6,554,345 B2 | 4/2003 | Jonsson |
| 6,585,151 B1 | 7/2003 | Ghosh |
| 6,644,721 B1 | 11/2003 | Miskech et al. |
| 6,811,744 B2 | 11/2004 | Keicher et al. |
| 6,866,497 B2 | 3/2005 | Saiki |
| 6,919,035 B1 | 7/2005 | Clough |
| 6,926,970 B2 | 8/2005 | James et al. |
| 7,152,292 B2 | 12/2006 | Hohmann et al. |
| 7,344,186 B1 | 3/2008 | Hausler et al. |
| 7,500,373 B2 | 3/2009 | Quell |
| 7,586,062 B2 | 9/2009 | Heberer |
| 7,637,134 B2 | 12/2009 | Burzlaff et al. |
| 7,710,347 B2 | 5/2010 | Gentilman et al. |
| 7,716,802 B2 | 5/2010 | Stern et al. |
| 7,745,293 B2 | 6/2010 | Yamazaki et al. |
| 7,766,123 B2 | 8/2010 | Sakurai et al. |
| 7,852,388 B2 | 12/2010 | Shimizu et al. |
| 7,908,922 B2 | 3/2011 | Zarabadi et al. |
| 7,951,324 B2 | 5/2011 | Naruse et al. |
| 8,094,036 B2 | 1/2012 | Heberer |
| 8,108,982 B2 | 2/2012 | Manuel et al. |
| 8,163,077 B2 | 4/2012 | Eron et al. |
| 8,286,236 B2 | 10/2012 | Jung et al. |
| 8,289,352 B2 | 10/2012 | Vartanian et al. |
| 8,297,096 B2 | 10/2012 | Mizumura et al. |
| 8,354,170 B1 | 1/2013 | Henry et al. |

(Continued)

FOREIGN PATENT DOCUMENTS

| | | |
|---|---|---|
| WO | 1996036455 A1 | 11/1996 |
| WO | 1996036525 A1 | 11/1996 |

(Continued)

OTHER PUBLICATIONS

US 9,202,136 B2, 12/2015, Schmidt et al. (withdrawn)

(Continued)

*Primary Examiner* — Hannah J Pak
(74) *Attorney, Agent, or Firm* — Arent Fox LLP

(57) ABSTRACT

Techniques for producing panels such as for use in a vehicle, boat, aircraft or other transport structure or mechanical structure using a 3-D-printed tooling shell are disclosed. A 3-D printer may be used to produce a tooling shell containing Invar and/or some other material for use in molding the panels. A channel may be formed in a 3-D printed tooling shell for enabling resin infusion, vacuum generation or heat transfer. Alternatively, or in addition to, one or more hollow sections may be formed within the 3-D printed tooling shell for reducing a weight of the shell. The panel may be molded using the 3-D printed tooling shell.

11 Claims, 7 Drawing Sheets

(56) References Cited

U.S. PATENT DOCUMENTS

| | | |
|---|---|---|
| 8,383,028 B2 | 2/2013 | Lyons |
| 8,408,036 B2 | 4/2013 | Reith et al. |
| 8,429,754 B2 | 4/2013 | Jung et al. |
| 8,437,513 B1 | 5/2013 | Derakhshani et al. |
| 8,444,903 B2 | 5/2013 | Lyons et al. |
| 8,452,073 B2 | 5/2013 | Taminger et al. |
| 8,599,301 B2 | 12/2013 | Dowski, Jr. et al. |
| 8,606,540 B2 | 12/2013 | Haisty et al. |
| 8,610,761 B2 | 12/2013 | Haisty et al. |
| 8,631,996 B2 | 1/2014 | Quell et al. |
| 8,675,925 B2 | 3/2014 | Derakhshani et al. |
| 8,678,060 B2 | 3/2014 | Dietz et al. |
| 8,686,314 B2 | 4/2014 | Schneegans et al. |
| 8,686,997 B2 | 4/2014 | Radet et al. |
| 8,694,284 B2 | 4/2014 | Berard |
| 8,720,876 B2 | 5/2014 | Reith et al. |
| 8,752,166 B2 | 6/2014 | Jung et al. |
| 8,755,923 B2 | 6/2014 | Farahani et al. |
| 8,787,628 B1 | 7/2014 | Derakhshani et al. |
| 8,818,771 B2 | 8/2014 | Gielis et al. |
| 8,873,238 B2 | 10/2014 | Wilkins |
| 8,978,535 B2 | 3/2015 | Ortiz et al. |
| 9,006,605 B2 | 4/2015 | Schneegans et al. |
| 9,071,436 B2 | 6/2015 | Jung et al. |
| 9,101,979 B2 | 8/2015 | Hofmann et al. |
| 9,104,921 B2 | 8/2015 | Derakhshani et al. |
| 9,126,365 B1 | 9/2015 | Mark et al. |
| 9,128,476 B2 | 9/2015 | Jung et al. |
| 9,138,924 B2 | 9/2015 | Yen |
| 9,149,988 B2 | 10/2015 | Mark et al. |
| 9,156,205 B2 | 10/2015 | Mark et al. |
| 9,186,848 B2 | 11/2015 | Mark et al. |
| 9,244,986 B2 | 1/2016 | Karmarkar |
| 9,248,611 B2 | 2/2016 | Divine et al. |
| 9,254,535 B2 | 2/2016 | Buller et al. |
| 9,266,566 B2 | 2/2016 | Kim |
| 9,269,022 B2 | 2/2016 | Rhoads et al. |
| 9,327,452 B2 | 5/2016 | Mark et al. |
| 9,329,020 B1 | 5/2016 | Napoletano |
| 9,332,251 B2 | 5/2016 | Haisty et al. |
| 9,346,127 B2 | 5/2016 | Buller et al. |
| 9,389,315 B2 | 7/2016 | Bruder et al. |
| 9,399,256 B2 | 7/2016 | Buller et al. |
| 9,403,235 B2 | 8/2016 | Buller et al. |
| 9,418,193 B2 | 8/2016 | Dowski, Jr. et al. |
| 9,457,514 B2 | 10/2016 | Schwarzler |
| 9,469,057 B2 | 10/2016 | Johnson et al. |
| 9,478,063 B2 | 10/2016 | Rhoads et al. |
| 9,481,402 B1 | 11/2016 | Muto et al. |
| 9,486,878 B2 | 11/2016 | Buller et al. |
| 9,486,960 B2 | 11/2016 | Paschkewitz et al. |
| 9,502,993 B2 | 11/2016 | Deng |
| 9,525,262 B2 | 12/2016 | Stuart et al. |
| 9,533,526 B1 | 1/2017 | Nevins |
| 9,555,315 B2 | 1/2017 | Aders |
| 9,555,580 B1 | 1/2017 | Dykstra et al. |
| 9,557,856 B2 | 1/2017 | Send et al. |
| 9,566,742 B2 | 2/2017 | Keating et al. |
| 9,566,758 B2 | 2/2017 | Cheung et al. |
| 9,573,193 B2 | 2/2017 | Buller et al. |
| 9,573,225 B2 | 2/2017 | Buller et al. |
| 9,586,290 B2 | 3/2017 | Buller et al. |
| 9,595,795 B2 | 3/2017 | Lane et al. |
| 9,597,843 B2 | 3/2017 | Stauffer et al. |
| 9,600,929 B1 | 3/2017 | Young et al. |
| 9,609,755 B2 | 3/2017 | Coull et al. |
| 9,610,737 B2 | 4/2017 | Johnson et al. |
| 9,611,667 B2 | 4/2017 | GangaRao et al. |
| 9,616,623 B2 | 4/2017 | Johnson et al. |
| 9,626,487 B2 | 4/2017 | Jung et al. |
| 9,626,489 B2 | 4/2017 | Nilsson |
| 9,643,361 B2 | 5/2017 | Liu |
| 9,662,840 B1 | 5/2017 | Buller et al. |
| 9,665,182 B2 | 5/2017 | Send et al. |
| 9,672,389 B1 | 6/2017 | Mosterman et al. |
| 9,672,550 B2 | 6/2017 | Apsley et al. |
| 9,676,145 B2 | 6/2017 | Buller et al. |
| 9,684,919 B2 | 6/2017 | Apsley et al. |
| 9,688,032 B2 | 6/2017 | Kia et al. |
| 9,690,286 B2 | 6/2017 | Hovsepian et al. |
| 9,700,966 B2 | 7/2017 | Kraft et al. |
| 9,703,896 B2 | 7/2017 | Zhang et al. |
| 9,713,903 B2 | 7/2017 | Paschkewitz et al. |
| 9,718,302 B2 | 8/2017 | Young et al. |
| 9,718,434 B2 | 8/2017 | Hector, Jr. et al. |
| 9,724,877 B2 | 8/2017 | Flitsch et al. |
| 9,724,881 B2 | 8/2017 | Johnson et al. |
| 9,725,178 B2 | 8/2017 | Wang |
| 9,731,730 B2 | 8/2017 | Stiles |
| 9,731,773 B2 | 8/2017 | Gami et al. |
| 9,741,954 B2 | 8/2017 | Bruder et al. |
| 9,747,352 B2 | 8/2017 | Karmarkar |
| 9,764,415 B2 | 9/2017 | Seufzer et al. |
| 9,764,520 B2 | 9/2017 | Johnson et al. |
| 9,765,226 B2 | 9/2017 | Dain |
| 9,770,760 B2 | 9/2017 | Liu |
| 9,773,393 B2 | 9/2017 | Velez |
| 9,776,234 B2 | 10/2017 | Ausen et al. |
| 9,782,936 B2 | 10/2017 | Glunz et al. |
| 9,783,324 B2 | 10/2017 | Embler et al. |
| 9,783,977 B2 | 10/2017 | Alqasimi et al. |
| 9,789,548 B2 | 10/2017 | Golshany et al. |
| 9,789,922 B2 | 10/2017 | Dosenbach et al. |
| 9,796,137 B2 | 10/2017 | Zhang et al. |
| 9,802,108 B2 | 10/2017 | Aders |
| 9,809,977 B2 | 11/2017 | Carney et al. |
| 9,817,922 B2 | 11/2017 | Glunz et al. |
| 9,818,071 B2 | 11/2017 | Jung et al. |
| 9,821,339 B2 | 11/2017 | Paschkewitz et al. |
| 9,821,411 B2 | 11/2017 | Buller et al. |
| 9,823,143 B2 | 11/2017 | Twelves, Jr. et al. |
| 9,829,564 B2 | 11/2017 | Bruder et al. |
| 9,846,933 B2 | 12/2017 | Yuksel |
| 9,854,828 B2 | 1/2018 | Langeland |
| 9,858,604 B2 | 1/2018 | Apsley et al. |
| 9,862,833 B2 | 1/2018 | Hasegawa et al. |
| 9,862,834 B2 | 1/2018 | Hasegawa et al. |
| 9,863,885 B2 | 1/2018 | Zaretski et al. |
| 9,870,629 B2 | 1/2018 | Cardno et al. |
| 9,879,981 B1 | 1/2018 | Dehghan Niri et al. |
| 9,884,663 B2 | 2/2018 | Czinger et al. |
| 9,898,776 B2 | 2/2018 | Apsley et al. |
| 9,914,150 B2 | 3/2018 | Pettersson et al. |
| 9,919,360 B2 | 3/2018 | Buller et al. |
| 9,931,697 B2 | 4/2018 | Levin et al. |
| 9,933,031 B2 | 4/2018 | Bracamonte et al. |
| 9,933,092 B2 | 4/2018 | Sindelar |
| 9,957,031 B2 | 5/2018 | Golshany et al. |
| 9,958,535 B2 | 5/2018 | Send et al. |
| 9,962,767 B2 | 5/2018 | Buller et al. |
| 9,963,978 B2 | 5/2018 | Johnson et al. |
| 9,971,920 B2 | 5/2018 | Derakhshani et al. |
| 9,976,063 B2 | 5/2018 | Childers et al. |
| 9,987,792 B2 | 6/2018 | Flitsch et al. |
| 9,988,136 B2 | 6/2018 | Tiryaki et al. |
| 9,989,623 B2 | 6/2018 | Send et al. |
| 9,990,565 B2 | 6/2018 | Rhoads et al. |
| 9,994,339 B2 | 6/2018 | Colson et al. |
| 9,996,890 B1 | 6/2018 | Cinnamon et al. |
| 9,996,945 B1 | 6/2018 | Holzer et al. |
| 10,002,215 B2 | 6/2018 | Dowski et al. |
| 10,006,156 B2 | 6/2018 | Kirkpatrick |
| 10,011,089 B2 | 7/2018 | Lyons et al. |
| 10,011,685 B2 | 7/2018 | Childers et al. |
| 10,012,532 B2 | 7/2018 | Send et al. |
| 10,013,777 B2 | 7/2018 | Mariampillai et al. |
| 10,015,908 B2 | 7/2018 | Williams et al. |
| 10,016,852 B2 | 7/2018 | Broda |
| 10,016,942 B2 | 7/2018 | Mark et al. |
| 10,017,384 B1 | 7/2018 | Greer et al. |
| 10,018,576 B2 | 7/2018 | Herbsommer et al. |
| 10,022,792 B2 | 7/2018 | Srivas et al. |
| 10,022,912 B2 | 7/2018 | Kia et al. |
| 10,027,376 B2 | 7/2018 | Sankaran et al. |

(56) References Cited

U.S. PATENT DOCUMENTS

| | | |
|---|---|---|
| 10,029,415 B2 | 7/2018 | Swanson et al. |
| 10,040,239 B2 | 8/2018 | Brown, Jr. |
| 10,046,412 B2 | 8/2018 | Blackmore |
| 10,048,769 B2 | 8/2018 | Selker et al. |
| 10,052,712 B2 | 8/2018 | Blackmore |
| 10,052,820 B2 | 8/2018 | Kemmer et al. |
| 10,055,536 B2 | 8/2018 | Maes et al. |
| 10,058,764 B2 | 8/2018 | Aders |
| 10,058,920 B2 | 8/2018 | Buller et al. |
| 10,061,906 B2 | 8/2018 | Nilsson |
| 10,065,270 B2 | 9/2018 | Buller et al. |
| 10,065,361 B2 | 9/2018 | Susnjara et al. |
| 10,065,367 B2 | 9/2018 | Brown, Jr. |
| 10,068,316 B1 | 9/2018 | Holzer et al. |
| 10,071,422 B2 | 9/2018 | Buller et al. |
| 10,071,525 B2 | 9/2018 | Susnjara et al. |
| 10,072,179 B2 | 9/2018 | Drijfhout |
| 10,074,128 B2 | 9/2018 | Colson et al. |
| 10,076,875 B2 | 9/2018 | Mark et al. |
| 10,076,876 B2 | 9/2018 | Mark et al. |
| 10,081,140 B2 | 9/2018 | Paesano et al. |
| 10,081,431 B2 | 9/2018 | Seack et al. |
| 10,086,568 B2 | 10/2018 | Snyder et al. |
| 10,087,320 B2 | 10/2018 | Simmons et al. |
| 10,087,556 B2 | 10/2018 | Gallucci et al. |
| 10,099,427 B2 | 10/2018 | Mark et al. |
| 10,100,542 B2 | 10/2018 | GangaRao et al. |
| 10,100,890 B2 | 10/2018 | Bracamonte et al. |
| 10,107,344 B2 | 10/2018 | Bracamonte et al. |
| 10,108,766 B2 | 10/2018 | Druckman et al. |
| 10,113,600 B2 | 10/2018 | Bracamonte et al. |
| 10,118,347 B2 | 11/2018 | Stauffer et al. |
| 10,118,579 B2 | 11/2018 | Lakic |
| 10,120,078 B2 | 11/2018 | Bruder et al. |
| 10,124,546 B2 | 11/2018 | Johnson et al. |
| 10,124,570 B2 | 11/2018 | Evans et al. |
| 10,137,500 B2 | 11/2018 | Blackmore |
| 10,138,354 B2 | 11/2018 | Groos et al. |
| 10,144,126 B2 | 12/2018 | Krohne et al. |
| 10,145,110 B2 | 12/2018 | Carney et al. |
| 10,151,363 B2 | 12/2018 | Bracamonte et al. |
| 10,152,661 B2 | 12/2018 | Kieser |
| 10,160,278 B2 | 12/2018 | Coombs et al. |
| 10,161,021 B2 | 12/2018 | Lin et al. |
| 10,166,752 B2 | 1/2019 | Evans et al. |
| 10,166,753 B2 | 1/2019 | Evans et al. |
| 10,171,578 B1 | 1/2019 | Cook et al. |
| 10,173,255 B2 | 1/2019 | TenHouten et al. |
| 10,173,327 B2 | 1/2019 | Kraft et al. |
| 10,178,800 B2 | 1/2019 | Mahalingam et al. |
| 10,179,640 B2 | 1/2019 | Wilkerson |
| 10,183,330 B2 | 1/2019 | Buller et al. |
| 10,183,478 B2 | 1/2019 | Evans et al. |
| 10,189,187 B2 | 1/2019 | Keating et al. |
| 10,189,240 B2 | 1/2019 | Evans et al. |
| 10,189,241 B2 | 1/2019 | Evans et al. |
| 10,189,242 B2 | 1/2019 | Evans et al. |
| 10,190,424 B2 | 1/2019 | Johnson et al. |
| 10,195,693 B2 | 2/2019 | Buller et al. |
| 10,196,539 B2 | 2/2019 | Boonen et al. |
| 10,197,338 B2 | 2/2019 | Melsheimer |
| 10,200,677 B2 | 2/2019 | Trevor et al. |
| 10,201,932 B2 | 2/2019 | Flitsch et al. |
| 10,201,941 B2 | 2/2019 | Evans et al. |
| 10,202,673 B2 | 2/2019 | Lin et al. |
| 10,204,216 B2 | 2/2019 | Nejati et al. |
| 10,207,454 B2 | 2/2019 | Buller et al. |
| 10,209,065 B2 | 2/2019 | Estevo, Jr. et al. |
| 10,210,662 B2 | 2/2019 | Holzer et al. |
| 10,213,837 B2 | 2/2019 | Kondoh |
| 10,214,248 B2 | 2/2019 | Hall et al. |
| 10,214,252 B2 | 2/2019 | Schellekens et al. |
| 10,214,275 B2 | 2/2019 | Goehlich |
| 10,220,575 B2 | 3/2019 | Reznar |
| 10,220,881 B2 | 3/2019 | Tyan et al. |
| 10,221,530 B2 | 3/2019 | Driskell et al. |
| 10,226,900 B1 | 3/2019 | Nevins |
| 10,232,550 B2 | 3/2019 | Evans et al. |
| 10,234,342 B2 | 3/2019 | Moorlag et al. |
| 10,237,477 B2 | 3/2019 | Trevor et al. |
| 10,252,335 B2 | 4/2019 | Buller et al. |
| 10,252,336 B2 | 4/2019 | Buller et al. |
| 10,254,499 B1 | 4/2019 | Cohen et al. |
| 10,257,499 B2 | 4/2019 | Hintz et al. |
| 10,259,044 B2 | 4/2019 | Buller et al. |
| 10,268,181 B1 | 4/2019 | Nevins |
| 10,269,225 B2 | 4/2019 | Velez |
| 10,272,860 B2 | 4/2019 | Mohapatra et al. |
| 10,272,862 B2 | 4/2019 | Whitehead |
| 10,275,564 B2 | 4/2019 | Ridgeway et al. |
| 10,279,580 B2 | 5/2019 | Evans et al. |
| 10,285,219 B2 | 5/2019 | Fetfatsidis et al. |
| 10,286,452 B2 | 5/2019 | Buller et al. |
| 10,286,603 B2 | 5/2019 | Buller et al. |
| 10,286,961 B2 | 5/2019 | Hillebrecht et al. |
| 10,289,263 B2 | 5/2019 | Troy et al. |
| 10,289,875 B2 | 5/2019 | Singh et al. |
| 10,291,193 B2 | 5/2019 | Dandu et al. |
| 10,294,552 B2 | 5/2019 | Liu et al. |
| 10,294,982 B2 | 5/2019 | Gabrys et al. |
| 10,295,989 B1 | 5/2019 | Nevins |
| 10,303,159 B2 | 5/2019 | Czinger et al. |
| 10,307,824 B2 | 6/2019 | Kondoh |
| 10,310,197 B1 | 6/2019 | Droz et al. |
| 10,313,651 B2 | 6/2019 | Trevor et al. |
| 10,315,252 B2 | 6/2019 | Mendelsberg et al. |
| 10,336,050 B2 | 7/2019 | Susnjara |
| 10,337,542 B2 | 7/2019 | Hesslewood et al. |
| 10,337,952 B2 | 7/2019 | Bosetti et al. |
| 10,339,266 B2 | 7/2019 | Urick et al. |
| 10,343,330 B2 | 7/2019 | Evans et al. |
| 10,343,331 B2 | 7/2019 | McCall et al. |
| 10,343,355 B2 | 7/2019 | Evans et al. |
| 10,343,724 B2 | 7/2019 | Polewarczyk et al. |
| 10,343,725 B2 | 7/2019 | Martin et al. |
| 10,350,823 B2 | 7/2019 | Rolland et al. |
| 10,356,341 B2 | 7/2019 | Holzer et al. |
| 10,356,395 B2 | 7/2019 | Holzer et al. |
| 10,357,829 B2 | 7/2019 | Spink et al. |
| 10,357,957 B2 | 7/2019 | Buller et al. |
| 10,359,756 B2 | 7/2019 | Newell et al. |
| 10,369,629 B2 | 8/2019 | Mendelsberg et al. |
| 10,382,739 B1 | 8/2019 | Rusu et al. |
| 10,384,393 B2 | 8/2019 | Xu et al. |
| 10,384,416 B2 | 8/2019 | Cheung et al. |
| 10,389,410 B2 | 8/2019 | Brooks et al. |
| 10,391,710 B2 | 8/2019 | Mondesir |
| 10,392,097 B2 | 8/2019 | Pham et al. |
| 10,392,131 B2 | 8/2019 | Deck et al. |
| 10,393,315 B2 | 8/2019 | Tyan |
| 10,400,080 B2 | 9/2019 | Ramakrishnan et al. |
| 10,401,832 B2 | 9/2019 | Snyder et al. |
| 10,403,009 B2 | 9/2019 | Mariampillai et al. |
| 10,406,750 B2 | 9/2019 | Barton et al. |
| 10,412,283 B2 | 9/2019 | Send et al. |
| 10,416,095 B2 | 9/2019 | Herbsommer et al. |
| 10,421,496 B2 | 9/2019 | Swayne et al. |
| 10,421,863 B2 | 9/2019 | Hasegawa et al. |
| 10,422,478 B2 | 9/2019 | Leachman et al. |
| 10,425,793 B2 | 9/2019 | Sankaran et al. |
| 10,427,364 B2 | 10/2019 | Alves |
| 10,429,006 B2 | 10/2019 | Tyan et al. |
| 10,434,573 B2 | 10/2019 | Buller et al. |
| 10,435,185 B2 | 10/2019 | Divine et al. |
| 10,435,773 B2 | 10/2019 | Liu et al. |
| 10,436,038 B2 | 10/2019 | Buhler et al. |
| 10,438,407 B2 | 10/2019 | Pavanaskar et al. |
| 10,440,351 B2 | 10/2019 | Holzer et al. |
| 10,442,002 B2 | 10/2019 | Benthien et al. |
| 10,442,003 B2 | 10/2019 | Symeonidis et al. |
| 10,449,696 B2 | 10/2019 | Elgar et al. |
| 10,449,737 B2 | 10/2019 | Johnson et al. |
| 10,461,810 B2 | 10/2019 | Cook et al. |
| 10,814,564 B2 * | 10/2020 | Hoyle .................... B29C 70/84 |

(56) References Cited

U.S. PATENT DOCUMENTS

| | | |
|---|---|---|
| 10,836,120 B2 * | 11/2020 | Martinez ............... B29C 70/088 |
| 2004/0135294 A1 | 7/2004 | Thrash et al. |
| 2006/0108783 A1 | 5/2006 | Ni et al. |
| 2009/0189320 A1 | 7/2009 | Bolick et al. |
| 2014/0159267 A1 | 6/2014 | Murch et al. |
| 2014/0277669 A1 | 9/2014 | Nardi et al. |
| 2015/0041098 A1 | 2/2015 | McGuire et al. |
| 2015/0044430 A1 | 2/2015 | Lee et al. |
| 2016/0368585 A1 | 12/2016 | Farouz-Fouquet |
| 2017/0113344 A1 | 4/2017 | Schönberg |
| 2017/0341309 A1 | 11/2017 | Piepenbrock et al. |
| 2018/0229401 A1 | 8/2018 | Gunner et al. |
| 2018/0250889 A1 | 9/2018 | Czinger et al. |
| 2018/0363691 A1 | 12/2018 | Gunner et al. |
| 2021/0001568 A1 * | 1/2021 | Hoyle ................... B29C 64/153 |

FOREIGN PATENT DOCUMENTS

| | | |
|---|---|---|
| WO | 1996038260 A1 | 12/1996 |
| WO | 2003024641 A1 | 3/2003 |
| WO | 2004108343 A1 | 12/2004 |
| WO | 2005093773 A1 | 10/2005 |
| WO | 2007003375 A1 | 1/2007 |
| WO | 2007110235 A1 | 10/2007 |
| WO | 2007110236 A1 | 10/2007 |
| WO | 2008019847 A1 | 2/2008 |
| WO | 2007128586 A3 | 6/2008 |
| WO | 2008068314 A2 | 6/2008 |
| WO | 2008086994 A1 | 7/2008 |
| WO | 2008087024 A1 | 7/2008 |
| WO | 2008107130 A1 | 9/2008 |
| WO | 2008138503 A1 | 11/2008 |
| WO | 2008145396 A1 | 12/2008 |
| WO | 2009083609 A2 | 7/2009 |
| WO | 2009098285 A1 | 8/2009 |
| WO | 2009112520 A1 | 9/2009 |
| WO | 2009135938 A1 | 11/2009 |
| WO | 2009140977 A1 | 11/2009 |
| WO | 2010125057 A2 | 11/2010 |
| WO | 2010125058 A1 | 11/2010 |
| WO | 2010142703 A2 | 12/2010 |
| WO | 2011032533 A1 | 3/2011 |
| WO | 2014016437 A1 | 1/2014 |
| WO | 2014187720 A1 | 11/2014 |
| WO | 2014195340 A1 | 12/2014 |
| WO | 2015193331 A1 | 12/2015 |
| WO | 2016116414 A1 | 7/2016 |
| WO | 2017036461 A1 | 3/2017 |
| WO | 2019030248 A1 | 2/2019 |
| WO | 2019042504 A1 | 3/2019 |
| WO | 2019048010 A1 | 3/2019 |
| WO | 2019048498 A1 | 3/2019 |
| WO | 2019048680 A1 | 3/2019 |
| WO | 2019048682 A1 | 3/2019 |

OTHER PUBLICATIONS

US 9,809,265 B2, 11/2017, Kinjo (withdrawn)
US 10,449,880 B2, 10/2019, Mizobata et al. (withdrawn)
International Search Report and Written Opinion dated May 4, 2018, regarding PCT/US2018/015235.

* cited by examiner

300

3D-PRINTED TOOLING SHELLS

CROSS REFERENCE TO RELATED APPLICATIONS

The present application is a continuation of U.S. patent application Ser. No. 15/430,395, filed Feb. 10, 2017, allowed, the content of which is hereby incorporated in its entirety as if fully set forth therein.

BACKGROUND

Field

The present disclosure relates generally to tooling techniques in manufacturing, and more specifically to producing panels for use in vehicles, boats, aircraft and other mechanical structures.

Background

Numerous types of panels are widely manufactured and used in transport structures such as vehicles, trucks, trains, motorcycles, boats, aircraft, and the like, as well as various other types of mechanical structures. Panels may be internal to the body of the structure, such as, for example, interior door panels within a vehicle. Panels may also include exterior body panels assembled as part of a vehicle's chassis. Among other functions, such exterior panels define the external shape and structure of the vehicle and are viewable by an observer outside the vehicle.

A wide variety of materials are used in the manufacture of such panels. Recently, manufacturers have paid particular attention to using materials that can minimize the weight of vehicles to increase fuel efficiency. Strength, durability, longevity and aesthetic appearance are other factors contributing to the selection of such materials for use in panels. Panels may be composed of molded plastic, metal, fiberglass, and wood, among other materials. More modern materials use composite materials that often include high strength-to-weight ratios and are optimal for addressing performance and safety specifications associated with vehicles and other transport structures.

Challenges that have arisen in recent years include determining more efficient, environmentally-friendly, faster, and less costly panel production techniques.

Particular obstacles faced by designers include the laborious and expensive processes of machining tooling shells used to mold the panels. For example, panels may require tooling shells in the molding phase that are composed of materials that are inherently difficult and costly to machine. The materials may also be bulky and unwieldy as a result of the machining process. Alternative manufacturing processes used to overcome these issues include, for example, casting the main tooling and then manufacturing the mold surface. However, among other problems, this solution is costly and time consuming, and therefore not suitable for low to medium volume production.

These and other shortcomings are addressed in the present disclosure.

SUMMARY

Several aspects of methods for producing panels will be described more fully hereinafter with reference to three-dimensional printing techniques.

One aspect of a method for producing a composite panel for a transport or other mechanical structure using a three-dimensional (3-D) printed tooling shell including Invar includes applying a composite material on a surface of the 3-D printed tooling shell, and forming the composite panel from the composite material using the 3-D printed tooling shell as a section of a mold.

Another aspect of a method of producing a panel for a transport or other mechanical structure using a three-dimensional (3-D) printed tooling shell including a hollow section includes applying a material on a surface of the 3-D printed tooling shell, and forming the panel from the material using the 3-D printed tooling shell as a section of a mold.

Another aspect of a method of producing a panel for a transport or other mechanical structure using a three-dimensional (3-D) printed tooling shell including a channel to enable resin infusion, vacuum generation, or heat transfer, includes applying a material on a surface of the 3-D printed tooling shell, and forming the panel from the material using the 3-D printed tooling shell as a section of a mold.

Another aspect of a method of producing a composite panel for a transport or other mechanical structure using a three-dimensional (3-D) printed tooling shell includes applying a composite material on a surface of the 3-D printed tooling shell, and forming the composite panel from the composite material using the 3-D printed tooling shell as a section of a mold, wherein the 3-D printed tooling shell comprises an alloy configured to include thermal characteristics and a stiffness suitable for forming the composite panel from the composite material.

It will be understood that other aspects of panels and methods of producing panels will become readily apparent to those skilled in the art from the following detailed description, wherein it is shown and described only several embodiments by way of illustration. As will be realized by those skilled in the art, the panels, tooling shells and methods for producing panels are capable of other and different embodiments and its several details are capable of modification in various other respects, all without departing from the invention. Accordingly, the drawings and detailed description are to be regarded as illustrative in nature and not as restrictive.

BRIEF DESCRIPTION OF THE DRAWINGS

Various aspects of tooling shells and methods for producing tooling shells will now be presented in the detailed description by way of example, and not by way of limitation, in the accompanying drawings, wherein.

DETAILED DESCRIPTION

Figure 1:
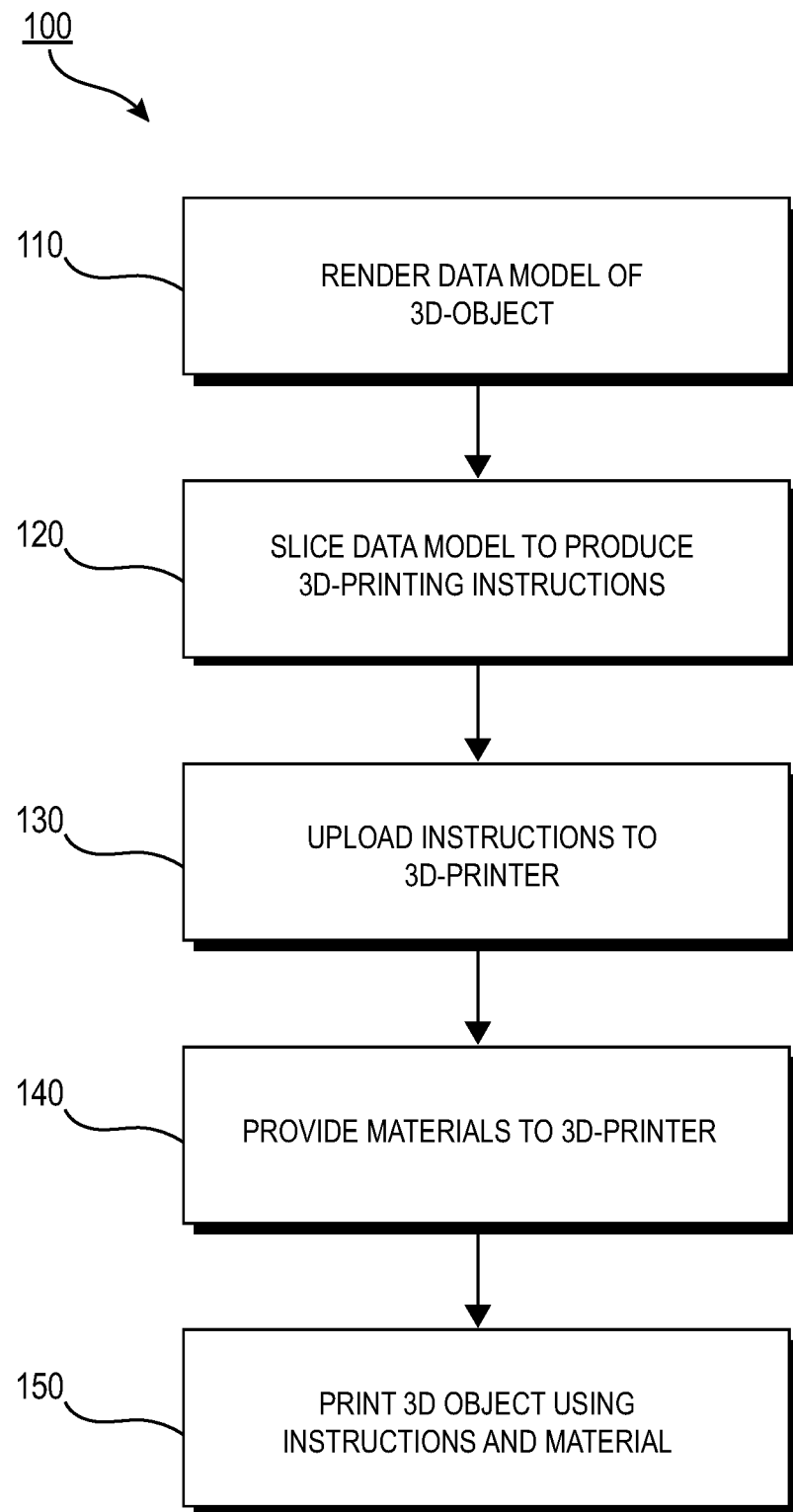
FIG. 1 is a flow diagram illustrating an exemplary process of initiating a process of 3-D printing.

The detailed description set forth below in connection with the appended drawings is intended to provide a description of various exemplary embodiments of tooling shells and method of producing tolling shells and is not intended to represent the only embodiments in which the invention may be practiced. The term "exemplary" used throughout this disclosure means "serving as an example, instance, or illustration," and should not necessarily be construed as preferred or advantageous over other embodiments presented in this disclosure. The detailed description includes specific details for the purpose of providing a thorough and complete disclosure that fully conveys the scope of the invention to those skilled in the art. However, the invention may be practiced without these specific details. In some instances, well-known structures and components may be shown in block diagram form, or omitted entirely, in order to avoid obscuring the various concepts presented throughout this disclosure.

A particular focus of attention in recent years has been the use of composite materials for creating panels. Generally, a composite material is formed from two or more different materials that are combined together to create specific properties that are superior to the original properties of the individual materials. Composite materials such as fiberglass and carbon fiber are used in the manufacture of composite panels used in transport or other mechanical structures.

Carbon fiber is a common material used in the formation of numerous, high-performance structures requiring stiffness, strength and durability without the heavy weight often associated with alternative candidate materials. Carbon Fiber Reinforced Polymer (CFRP) is an extremely strong and lightweight fiber-reinforced plastic. As the name suggests, CFRP includes materials formed using a combination of carbon fibers and a polymer-based resin (or other binding agent) to form a new composite material with durable properties that exceed its constituent materials. Due to its strength and lightweight nature, CFRP is frequently used in the manufacture of body panels and other components for vehicles, boats, motorcycles, aircraft, and other mechanized assemblies, in addition to having numerous other industrial and commercial applications.

In conventional production techniques, a tool for molding the composite material is typically manufactured using labor-intensive processes. For example, a machining process may be used to manufacture a pair of tooling shells which may each constitute one of a positive and a negative section of a mold. Materials and resin may be placed in the mold between the positive and negative tooling shell sections to thereby shape a panel constituting the target composite material. The tooling shells, in turn, are typically composed of one or more materials that are chemically and structurally suitable for use in molding the subject materials.

Suitable candidate materials for the tooling shells include those that can withstand the pressures associated with molding and that have thermal characteristics compatible with a given composite material. Unfortunately, many such candidate materials are difficult and costly to machine into tooling shells using traditional methods. These latter methods often involve the time-consuming and laborious process of shaping an expensive block of material having tough or ductile properties or other undesirable characteristics not conducive to the machining process. As an illustration, some otherwise desirable materials may be soft and gummy, making them difficult to accurately cut. This renders tasks like carving the material and formulating detailed structure therein a particular manufacturing challenge. For these and other reasons, labor-intensive machining techniques can result in complex and costly obstacles to manufacturers. They can also impose significant practical limitations on the allowable shape, size and geometrical complexity of the resulting tooling shell such that, for example, it may be difficult or impractical to construct certain desired features or to streamline an optimal shape of the shell. The resulting tooling shell may be bulky and unwieldy, imposing additional burdens on persons working with the materials to mold panels. Certain aspects of the disclosure herein consequently address the challenges of producing panels using tooling shells. One such aspect includes the use of 3-D printed tooling shells to mold the panels, as described further below.

The use of 3-D printing in the context of composite tooling provides significant flexibility for enabling manufacturers of structures incorporating body panels to manufacture parts with complex geometries. For example, 3-D printing techniques provide manufacturers with the flexibility to design and build parts having intricate internal lattice structures and/or profiles that are not possible to manufacture via traditional manufacturing processes.

FIG. 1 is a flow diagram 100 illustrating an exemplary process of initiating a process of 3-D printing. A data model of the desired 3-D object to be printed is rendered (step 110). A data model is a virtual design of the 3-D object. Thus, the data model may reflect the geometrical and structural features of the 3-D object, as well as its material composition. The data model may be created using a variety of methods, including 3D scanning, 3D modeling software, photogrammetry software, and camera imaging.

3D scanning methods for creating the data model may also use a variety of techniques for generating a 3-D model. These techniques may include, for example, time-of flight, volumetric scanning, structured light, modulated light, laser scanning, triangulation, and the like.

3-D modeling software, in turn, may include one of numerous commercially available 3-D modeling software applications. Data models may be rendered using a suitable computer-aided design (CAD) package, for example in an STL format. STL files are one example of a file format associated with commercially available CAD software. A CAD program may be used to create the data model of the 3-D object as an STL file. Thereupon, the STL file may undergo a process whereby errors in the file are identified and resolved.

Following error resolution, the data model can be "sliced" by a software application known as a slicer to thereby produce a set of instructions for 3-D printing the object, with the instructions being compatible and associated with the particular 3-D printing technology to be utilized (step 120). Numerous slicer programs are commercially available. Generally, the slicer program converts the data model into a series of individual layers representing thin slices (e.g., 100 microns thick) of the object be printed, along with a file containing the printer-specific instructions for 3-D printing these successive individual layers to produce an actual 3-D printed representation of the data model.

A common type of file used for this purpose is a G-code file, which is a numerical control programming language that includes instructions for 3-D printing the object. The G-code file, or other file constituting the instructions, is uploaded to the 3-D printer (step 130). Because the file containing these instructions is typically configured to be operable with a specific 3-D printing process, it will be appreciated that many formats of the instruction file are possible depending on the 3-D printing technology used.

In addition to the printing instructions that dictate what and how an object is to be rendered, the appropriate physical materials necessary for use by the 3-D printer in rendering the object are loaded into the 3-D printer using any of several conventional and often printer-specific methods (step 140). In fused deposition modelling (FDM) 3-D printers, for example, materials are often loaded as filaments on spools, which are placed on one or more spool holders. The filaments are typically fed into an extruder apparatus which, in operation, heats the filament into a melted form before ejecting the material onto a build plate or other substrate, as further explained below. In selective laser sintering (SLS) printing and other methods, the materials may be loaded as powders into chambers that feed the powder to a build platform. Depending on the 3-D printer, other techniques for loading printing materials may be used.

The respective data slices of the 3-D object are then printed based on the provided instructions using the material(s) (step 150). In 3-D printers that use laser sintering, a laser scans a powder bed and melts the powder together where structure is desired, and avoids scanning areas where the sliced data indicates that nothing is to be printed. This process may be repeated thousands of times until the desired structure is formed, after which the printed part is removed from a fabricator. In fused deposition modelling, parts are printed by applying successive layers of model and support materials to a substrate. In general, any suitable 3-D printing technology may be employed for purposes of this disclosure.

Figure 2:
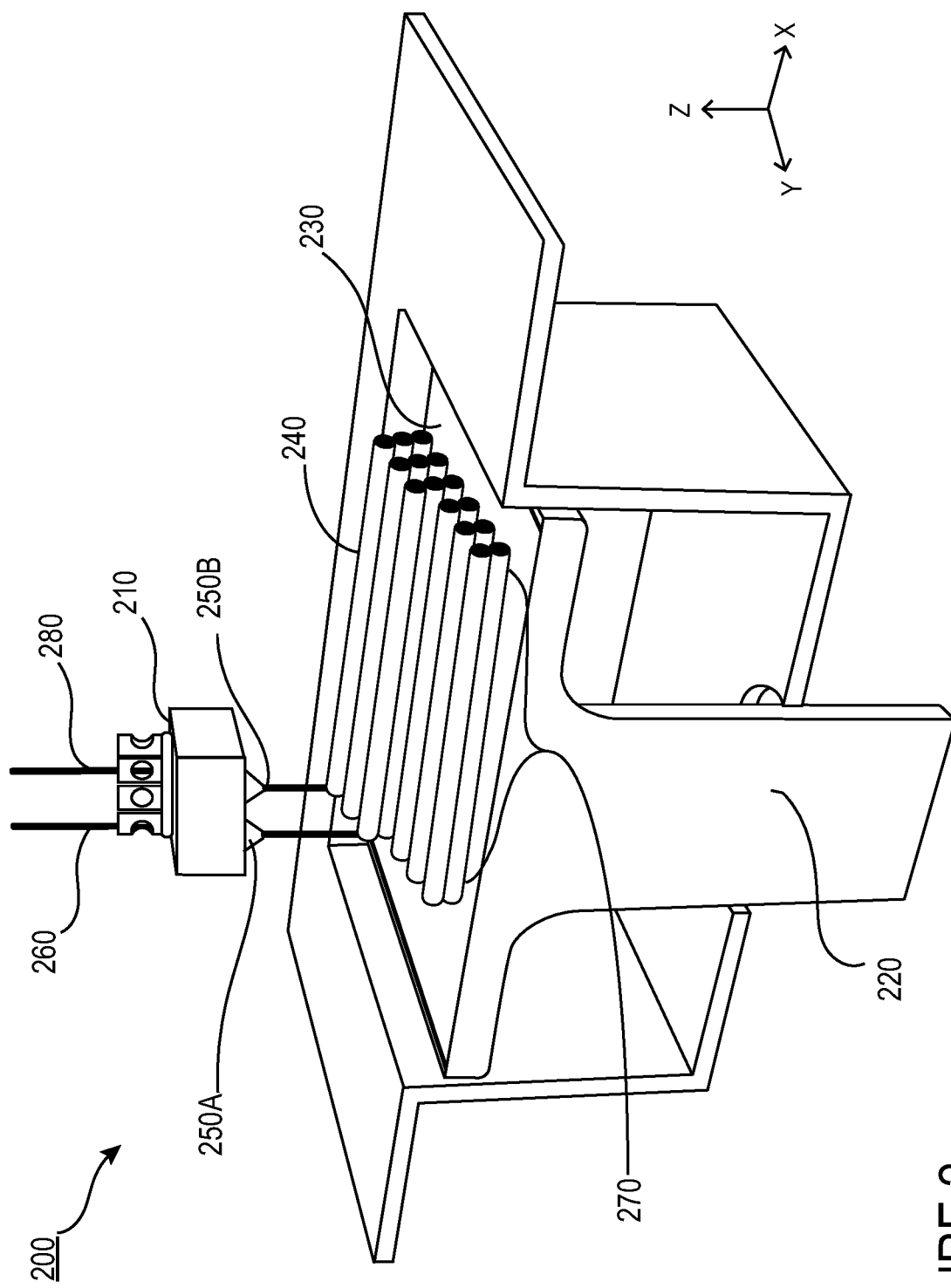
FIG. 2 is a block diagram of an exemplary 3-D printer.

FIG. 2 is a block diagram of an exemplary 3-D printer 200. While any number of 3-D printed technologies can be suitably employed, the 3-D printer 200 of FIG. 2 is discussed in the context of an FDM technique. 3-D printer 200 includes an FDM head 210 which in turn includes extrusion nozzles 250A and 250B, a moveable build stage 220, and a build plate 230 at the top of the build stage 220.

Depending on the intended composition of the structure and the need for any support material for providing support to overhanging elements of the structure that might otherwise be subject to possible gravitational deformation or collapse, a plurality of materials may be used for printing an object. One or more suitable filament materials 260 may be wound on a spool (not shown) and fed into FDM head 210. (In other technologies described above, the material may be provided as a powder or in other forms). The FDM head 210 can be moved in X-Y directions based on the received printing instructions by a numerically controlled mechanism such as a stepper motor or servo motor. The material, which may in one exemplary embodiment constitute a thermoplastic polymer, may be fed to the FDM head 210 which includes the extrusion nozzles 250A and 250B. The extruder in FDM head 210 heats the filament material 260 into a molten form, and extrusion nozzle 250*a* ejects the molten material and deposits it onto the build plate 230 of build stage 220.

Responsive to the received printing instructions, the FDM head 210 moves about a horizontal (X-Y) plane such that extrusion nozzle 250A drops the material 260 at the target location to form a line 240 of applied material. (The FDM head 210 may also be configured to move in the Z-direction and/or to rotate about one or more axes in certain configurations). The layer 270 of material 260, including line 240, is formed by depositing the material 260 line by line, with each line of the material 260 hardening as the material is deposited on the build plate 230. After one layer 270 is formed at the appropriate locations in the X-Y plane, the next layer may be formed in a similar way.

The build plate 230 may be a component of a controlled table moveable in at least the vertical Z direction. When rendering of a layer 270 is completed, the build stage 220 and build plate 230 may lower by an amount proportional to the thickness of layer 270 in the vertical (Z) direction so that the printer can begin application of the next layer, and so on until a plurality of cross sectional layers 240 having a desired shape and composition are created.

While a substantially rectangular structure of layers is shown for purposes of simplicity in this illustration, it will be appreciated that the actual printed structure may embody substantially any shape and configuration depending on the data model. That is, the actual shape of the rendered layers will correspond to the defined geometry of the 3D-model being printed.

In addition, as indicated above, a plurality of different materials may be used to print the object. In some instances, two different materials 260 and 280 may concurrently be applied by respective extruder nozzles 250A and 250B.

Panels for transport and other mechanical structures may be constructed from various composite materials that provide strong support with a lightweight structure. One such material attractive for use in molding these panels is Invar, a nickel steel (Ni—Fe) alloy. Invar is used as a tooling shell in the production of composites such as CFRP and the like. Invar is known for its low coefficient of thermal expansion (CTE) and thus its relative lack of expansion or contraction with temperature changes. Invar has a CTE that is relatively similar to that of Carbon Fiber Reinforced Polymer (CFRP). For this reason, Invar is commonly used as a mold in CFRP composite tooling. The use of an Invar tool may be particularly desirable for producing CFRP structures because a significant CTE mismatch between the tooling material and the composite material can cause unwanted thermal expansion of materials. Such expansion can be detrimental in manufacturing high tolerance composite parts. The use of Invar in connection with CFRP tooling reduces the phenomenon of CTE mismatch. Invar is stable and nearly immune to shrinkage or expansion due to extreme changes in temperature. Invar is consequently desirable for use in molding CFRP and similar materials.

An exemplary table setting forth Invar's approximate CTE as a function of its temperature is provided below.

| Temperature (° F.) | CTE ($\times 10^{-6}$ ° F.$^{-1}$) |
|---|---|
| 200 | 0.72 |
| 300 | 1.17 |
| 500 | 2.32 |
| 700 | 4.22 |

In addition, the approximate modulus of elasticity of Invar is 20.5 Mpsi. The elasticity modulus is a general measure of a material's resistance to being deformed when a force (such as a molding force) is applied to it. This value of the modulus of elasticity provides Invar with a high stiffness that is suitable for dimensional stability of the resulting tooling shell.

In other embodiments, a method for 3-D printing tooling shell includes using, in lieu of Invar, a different alloy that has thermal properties and stiffness characteristics that are suitable for molding a composite panel including carbon fiber. Thus, for example, an alloy that includes characteristics that are comparable to the exemplary values described above may be a suitable material for the 3-D printed tooling shell.

As discussed above, many materials that are otherwise suitable for use as tools in producing body panels are difficult to construct. Being tough and ductile, Invar, for one, is notoriously difficult and expensive to machine. The difficulty and time-consuming nature of sculpting Invar using traditional machining techniques often results in Invar tools that are unnecessarily thick and heavy, making such tools more difficult for workers to handle in the molding process. Further, the machining limitations of Invar and similar materials make it difficult or impractical to accurately integrate detailed structural features in the tooling shell that may otherwise be useful in the ensuing molding process. Thus, existing Invar and similar tools lack versatility. The cost and complexity of the machining and tooling processes for these materials increase significantly in direct proportion to the increase of part performance requirements (such as, for example, in vehicle and aircraft applications), the number of parts to be produced, the complexity of the parts, and other factors. Additionally, the excessive mass of these tools requires extended thermal ramp-up and cool down parameters in the molding process, limiting the production cycle time and associated rate capability.

To address these and other deficiencies in the art, a 3-D printed tooling shell may be incorporated, for example, as a section of a mold for use in producing panels for use in structures. In an exemplary embodiment, the 3-D printed tooling shell includes Invar or similarly performing alloys and is used to mold composite body panels using a carbon fiber composite material such as CFRP. Preferably the 3-D printed tooling shell is comprised of substantially Invar or a similar alloy. "Substantially Invar" means that the 3-D printed tooling shell is comprised of pure Invar, or principally of Invar with some minor composition of other materials (whether intended materials or impurities) that do not materially affect the CTE or other desirable properties of the tooling shell to serve its intended purpose, or of an Invar-like alloy that has similar mechanical and thermal (CTE) characteristics.

FIGS. 3A-D are diagrams illustrating side views of a panel and 3D-printed tooling shells, and various stages of a process for using a 3D-printed tooling shell for producing the panel. FIG. 4 is a flow diagram illustrating an exemplary process for producing a 3D-printed tooling shell used for producing a panel for use in a structure. In one exemplary embodiment, the tooling shell is being used as one of a positive or negative a mold to produce the body panel in one of any conventional molding processes. In the embodiment shown, the body panel contemplated for production is composed of CFRP.

It should be understood that the tooling shells herein are not limited to molding composite body panels, and practitioners in the art will appreciate that the disclosed tooling shells can be used in a variety of industrial and commercial applications.

In the paragraphs that follow, FIGS. 3 and 4 will be collectively referenced, where appropriate.

Figure 3A:
FIGS. 3A-D are diagrams illustrating side views of an exemplary panel and exemplary 3D-printed tooling shells, and various stages of a process for using a 3D-printed tooling shell for producing the panel.
Figure 4A:
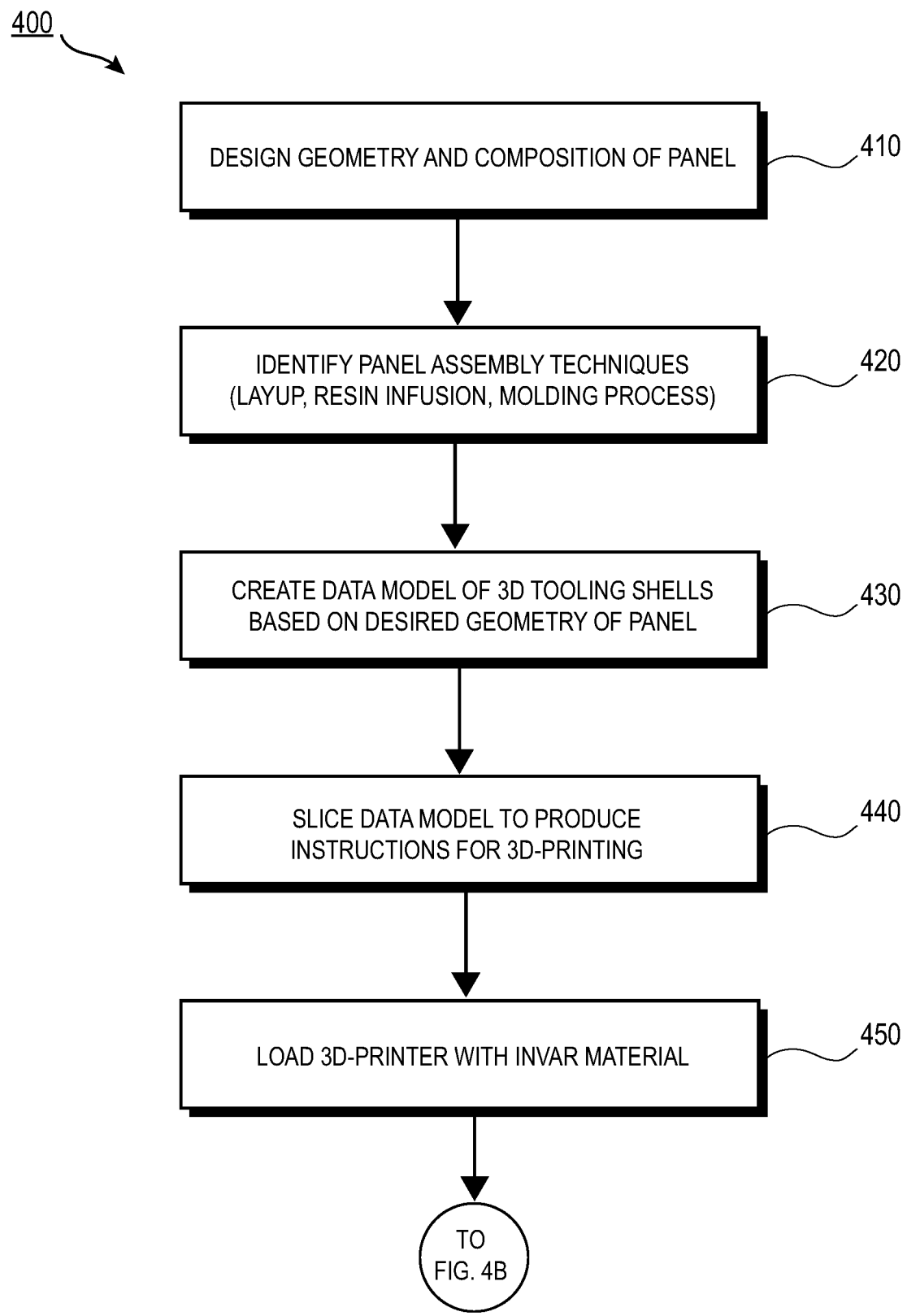
FIGS. 4A-B are a flow diagram illustrating an exemplary process for producing a 3D-printed tooling shell used for producing a panel for use in a structure.
Figure 4B:
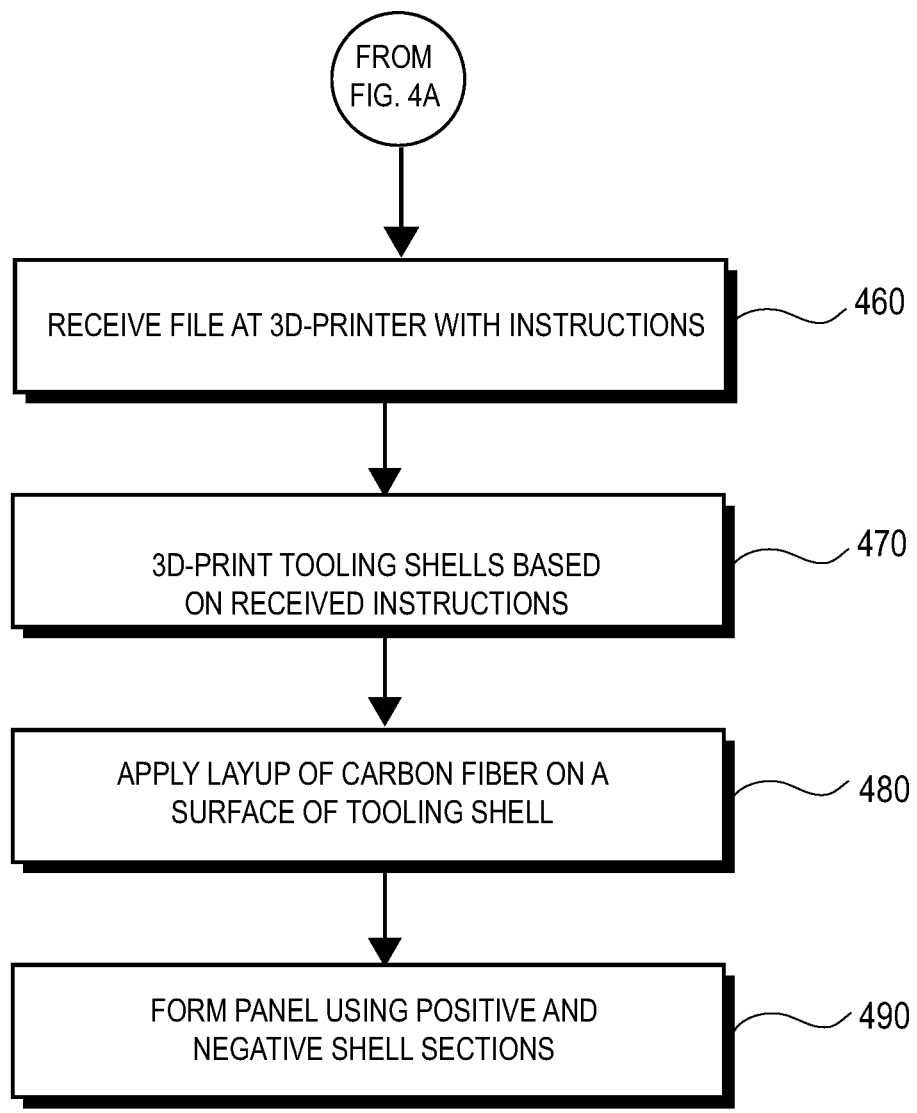

Referring initially to FIG. 3A and FIG. 4, the topology optimization phase at the concept level of the design process is described. In this phase, the geometry and composition of a composite body panel 302 may be designed (step 410). That is, the panel's overall topology, its specific composition of materials, its geometrical and structural features, and any other desired properties or characteristics may be defined at this stage. The material layout for the body panel may be optimized based on an understood set of loads and design constraints such that the layout adheres to some target performance objectives. In the case of manufacturing an automobile, for example, this step may include identifying the structure, shape and features of the panel desired, and the composition of materials necessary for producing the panel, that allow the panel to fall within certain desired specifications (e.g., weight requirements and safety specifications, etc.).

The specific panel assembly techniques may then be identified (step 420). This step may include, for example, identification and selection of the specific method of assembly of the panel 302 (such as an identification of the molding and resin infusion processes to be used), selection of the layup process (such as wet versus dry layup, etc.), determination of the resin infusion process, and determination of the architecture and composition of the tooling shells. That is, this step may further include determination of the desired structures, geometries and compositions of the tooling shells based on the above-identified properties of the panel design. For example, tooling shells may have different structures based on whether the tooling shell is part of a positive or negative mold section, as described further below.

It will be appreciated that in other embodiments and depending on the application involved, part or all of the steps 410 and 420 in FIG. 4 may equally well occur in reverse order such that the manufacturing and assembly techniques may precede one or more of the steps involved in designing the features of the panel.

In addition, it is generally understood that in many conventional molding techniques, at least two tooling shells are used as part of a mold for creating a part. For example, in an exemplary embodiment, a molding process as described herein may use a first tooling shell as a positive section of the mold and a second tooling shell as a negative section of the mold. The positive section of the mold may ultimately embody the intended shape of the part, such as the external surface of a body panel on a vehicle. The construction and number of tooling shells used herein may consequently vary depending on the specific molding techniques employed. It should be noted that wide variety of molding techniques may be employed depending on the application and potentially other factors such as the anticipated volume of production, etc.

For example, in one exemplary embodiment, the use of prepregs with vacuum bagging equipment is employed. Vacuum bagging is a technique used to create mechanical pressure on the laminate during the cure cycle. Among other benefits, pressurizing the composite laminate using vacuum bagging removes trapped air, compacts the fiber layers, and reduces humidity. In another exemplary embodiment, autoclave molding using high pressures is employed. Autoclave molding is a standard composite manufacturing procedure that provides pressure and temperature according to a particular thermal curing cycle. The high pressure applied using this technique ensures a significant void reduction inside the composite structure. The aforementioned techniques may be suitable in certain implementations involving low production volumes of parts.

With reference to the panel assembly techniques (step 420), which may include identification of the features of the tooling shell, a suitable data model may be constructed based on these features (step 430). The data model may describe the 3-D geometry and composition of the tooling shells as identified with respect to step 410. In an exemplary embodiment, a CAD program is used to create one or more files, such as an STL file, containing the data model. In some embodiments, the data model generation process may overlap with one or more of the processes identified with respect to steps 410 and 420. For example, the data model may be generated concurrently with the panel design.

The data model generated in step 430 may be converted via a slicer program or other available procedure to a set of instructions suitable for input to a 3D printer (step 440). Generally, the structure and geometry of the tooling shells to be rendered may be developed and described in one or more electronic files and/or software programs to be used as the input of a 3-D printer, as is conventionally understood.

The 3-D printer is then loaded with the suitable printing materials, by way of example, Invar or, if desired, additional materials for use as the model material in constructing the tooling shell along with any support materials required (step 450). As discussed above, the materials may be loaded as a spool with filament in a 3D printer, as a powder, or through another suitable technique specific to the 3-D printer in use. In addition, the program files generated in connection with step 440, above, are input to the 3-D printer such that the 3-D printer receives instructions for printing the tooling shell (step 460). It will be appreciated that the supplying of materials to the 3-D printer may occur at any suitable stage of the processes described herein and is not necessarily limited to the order ascribed this step in FIG. 4.

Figure 3B:
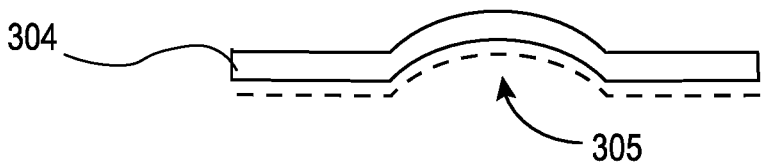

Using the instructions, the 3-D printer prints a tooling shell 304 (FIG. 3B, FIG. 4, step 470). In general, 3-D printing may include a process of making a three-dimensional structure based on a computational or electronic model as an input. For example, the 3-D printer may print the tooling shell having a complex inner lattice matrix section in the tooling shell. The 3-D printer can be configured to generate the tooling shell through additive and/or subtractive manufacturing, or via another method. Any suitable 3-D printing process may be used. The 3-D printer may be a direct metal laser sintering (DMLS) printer, electron beam melting (EBM) printer, fused deposition modeling (FDM) printer, a Polyjet printer, or any of the techniques described elsewhere in this disclosure. The 3-D printer may use extrusion deposition, granular binding, lamination, or stereolithography. As described above, the 3-D printing process may involve breaking down the design of the 3-D object into a series of successive digital layers or slices, which the printer will then form layer-by-layer until the rendered object is completed. Tooling shells as described herein may have different geometries and complexities and may be printed in a layer-by-layer fashion. A wide range of geometric designs and detailed internal and external features of the tooling shell may also be accommodated.

In addition, the 3-D printing as contemplated herein may involve complex matrix arrays as backing structures, eliminating the need for temporary support material during the 3DP process, and giving reduced tooling thermal mass and lower material usage, thereby reducing manufacturing cost of the tool and lower molding process time due to reduced thermal cycle time.

The example in FIG. 3B shows a simplified geometry of a resulting tooling shell 304 that is intentionally designed to be relatively thin. In an exemplary embodiment, the tooling shell may be an Invar tooling shell, which is a tooling shell substantially composed of Invar as defined above. Shell thickness and backing structure matrix density can be optimized to minimize tool mass based on tool size and form so that sufficient tool stiffness and stability during curing is met. Geometry and dimensions for channels can be optimized similarly.

Thus, in contrast to prior techniques involving the machining of often unwieldy and unnecessarily large chunks of Invar material, 3-D printing the tooling shell (using Invar or other suitable materials) provides significant flexibility to design and print a tool having a shape and geometry that is generally easier to manipulate in the manufacturing process. Thus, one of several advantages of the 3-D printed tooling shell 304 is that, in contrast to a bulky or heavy shells that are machined using conventional methods, the tooling shell 304 may be constructed to be relatively thin and lightweight, saving material costs.

It will nonetheless be appreciated that any number of desired tool shapes and structures may be contemplated depending on the molding process to be used and design requirements of the panel to be produced using the tooling shell. The use of 3-D printing of the tooling shell also provides the designer with significant flexibility to produce shells having very complex shapes to mold more complicated panel designs.

Referring still to FIG. 3B, a geometry 305 of a panel to be molded within the tooling shell 304 may be designed to conform to the shape of an inner surface of the tooling shell 304, depending on how the mold is configured. In this manner, the tooling shell acts as a section of a mold to shape the composite material that will be cured into the panel, as described further below.

Figure 3C:
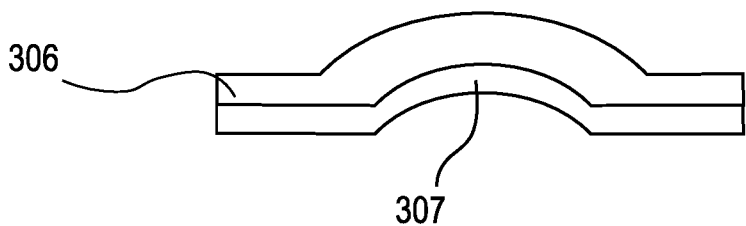

After the tooling shells are printed, they may be used to produce a panel (FIG. 4, steps 480, 490). The composite layup may be performed using the tooling shell. FIG. 3C illustrates a second 3-D printed tooling shell 307 designed to be used in conjunction with the first 3-D printed tooling shell 304 as first and second sections of a mold. In this example, carbon fiber material 306 (or another suitable material) may be applied via a layup process on the back or outer surface of the tooling shell 307 as a first step in producing a panel. The carbon fiber material 306 may be laid over the tooling shell 307. (In other embodiments, the material 306 may alternately or additionally be applied over an inner surface of tooling shell 304).

In one exemplary embodiment, a layup uses pre-impregnated ("prepreg") carbon fiber plies that are delivered onto the tooling shell 307 with the resin matrix applied. The prepreg technique provides effective resin penetration and assists in ensuring substantially uniform dispersion of the resin. The prepreg plies may be applied onto the tooling shell 307 to form a laminate stack.

In another embodiment, a dry layup may use dry woven fiber sheets. Resin may thereupon be applied to the dry plies after layup is complete, such as by resin infusion. In an alternative exemplary embodiment, wet layup may be used wherein each ply may be coated with resin and compacted after being placed.

Figure 3D:
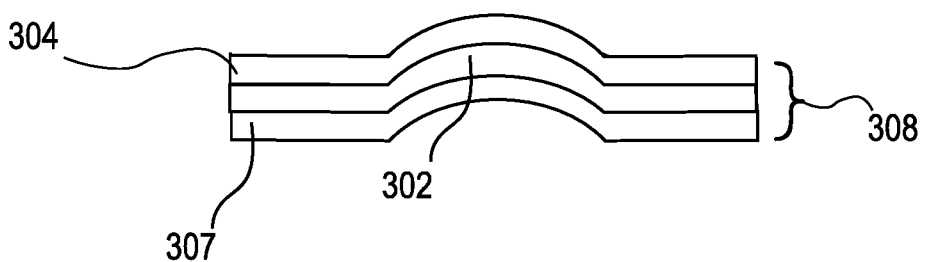

FIG. 3D shows a mold 308. Where Invar is used, the Invar tooling shell 304 is applied over the Invar tooling shell 307 as positive and negative sections in a mold to shape the carbon fiber material into the form of the body panel 302 (step 490). Upon completion of the molding process, the carbon fiber material may, for example, be vacuum compacted and baked in an oven for a designated time period.

The specific molding and resin infusion processes used during these stages may vary depending on variables such as molding techniques, design constraints, and desired manufacturing yield. Generally, the 3-D-printed tooling shell may be used in connection with a variety of composite manufacturing techniques including, for example, Resin Transfer Molding (RTM), hand layup, prepregs, sheet molding, and Vacuum Assisted Resin Transfer Molding (VARTM).

For example, with reference to the mold 308 of FIG. 3D following carbon fiber layup, clamps may be affixed on respective left and right sides of the mold 308 to press tooling shells 304 and 307 together. One of the tooling shells may include a channel (as described below) through which low viscosity resin and an appropriate catalyst can flow via a resin injector. Temperature control may also be maintained via one or more heating channels.

The use of the above-described techniques to produce the tooling shells 304 and 307 may be suitable in some implementations for manufacturing approximately 1-500 composite body panels. In other instances, these techniques may be employed to produce more than 500 parts, whether alone or using a platen press or other method. Among other benefits, the tooling technique according to these aspects accords manufacturers with significant flexibility to produce both tooling shells and composite panels having varying geometries and complexities.

As an illustration of this flexibility, tooling shells may be 3-D printed incorporating one or more hollow sections. The use of defined hollow sections in the tooling shells achieved via 3-D-printing may result in considerable weight savings for the tooling. In addition to decreased costs as a result of saving material and reduced time for 3-D-printing, the tooling shells constructed as described herein may be made easier and less wieldy for use in the panel tooling process.

In another exemplary embodiment, the tooling shells are 3-D-printed with integrated channel structures. Various channels may be used in connection with the manufacturing processes of composite panels and other structures. These channels may, for example, include heating or cooling channels, channels for resin infusion, channels for vacuum generation, and the like. The channels can easily be integrated into the tooling shells themselves via 3-D printing techniques. In addition to providing great flexibility, these techniques may save the manufacturer considerable time and expense with respect to the machining processes of Invar and other materials used in such tooling shells.

Figure 5:
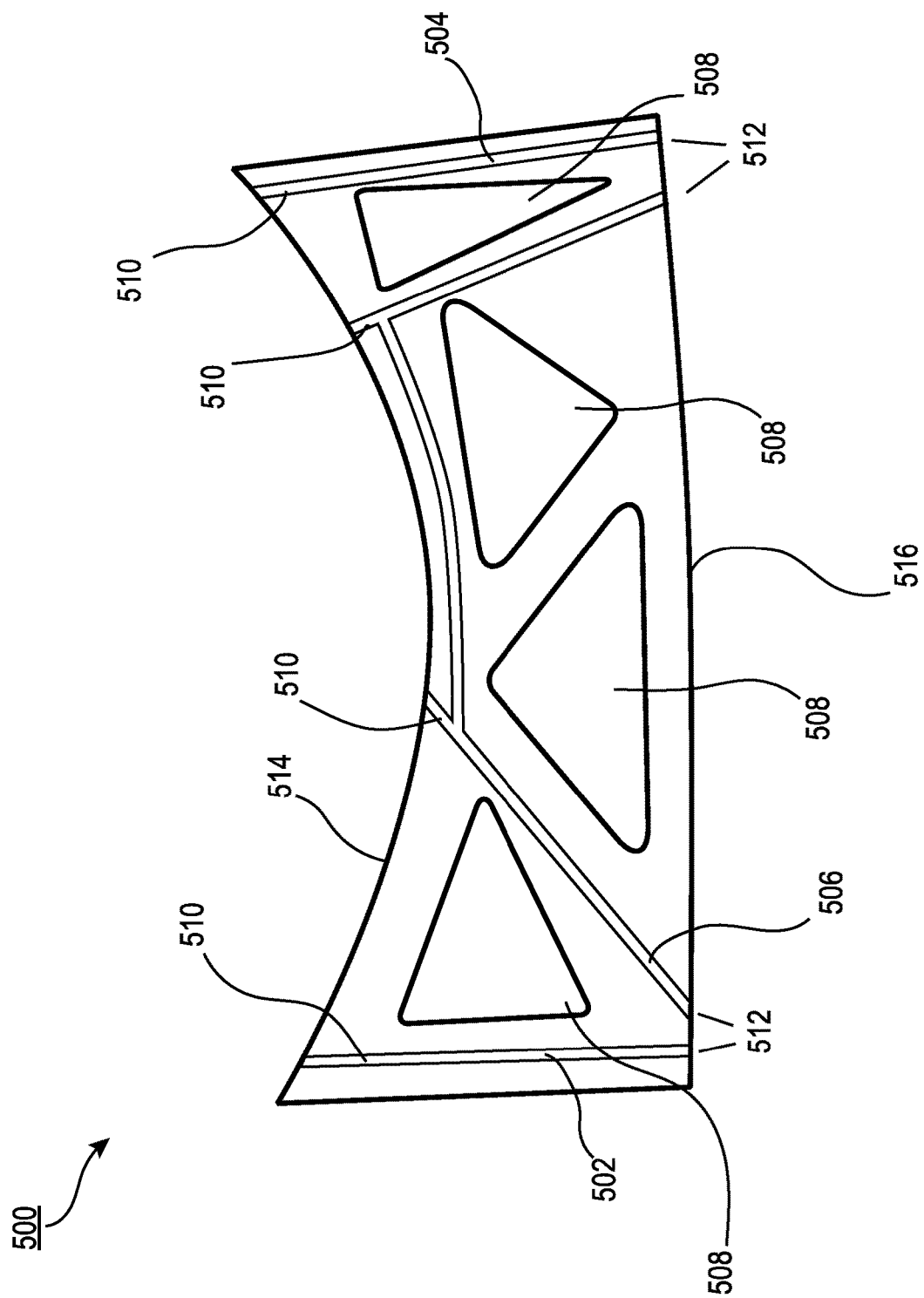
FIG. 5 is a cross-sectional view of an exemplary 3-D printed tooling shell incorporating hollow structures and integrated channels.

FIG. 5 is an exemplary cross-sectional view of a 3-D printed tooling shell 500 incorporating hollow structures and integrated channels. The tooling shell may be composed of Invar, in whole or part, or of one or more different materials, depending on the application for which the tooling shell is suited and on the composition of the panel to be produced. Unlike conventional Invar tooling shells and other materials that are comparatively difficult to machine, the 3-D printed tooling shell 500 of FIG. 5 can be modeled to include any number of complex geometries.

For example, the tooling shell 500 may comprise a plurality of hollow sections 508.

These hollow sections 508 are, more fundamentally, defined volumes of material vacancies within the tooling shell 500. These defined volumes function to reduce an overall weight of the tooling shell 500 without sacrificing the amount of structural integrity required for the tooling shell 500 to be used in the molding process. While four hollow sections 508 are shown in this example, any number of hollow sections, including a single hollow section disposed substantially along an axis of the tooling shell 500, may be used. Also, in lieu of hollow sections 508 disposed exclusively within the material, the hollow sections may also be formed as one or more indentations in the material, such that at least one surface of the hollow section is exposed and such that the hollow section is not necessarily entirely within the tooling shell 500. Alternatively, the sections 508 may not be entirely empty but may, for maintenance of structural integrity or for other purposes, be filled with a substance that is substantially lighter than the base material(s) used to create the tooling shell.

The use of hollow sections 508 is particularly advantageous in numerous contexts.

One context involves workers performing various stages of a manual molding process. Carrying the tooling shells and assembling the mold becomes easier, especially where, as is commonplace, the base materials from which the tooling shells are formed are otherwise heavy and impose burdens on the workers assembling and using the mold.

In another exemplary embodiment, the 3-D printed tooling shell 500 comprises a plurality of integrated channels 502, 504, 506. These channels constitute spaces within the tooling shell 500 that channel substances, gasses or heat to or from a surface 514 of the tooling shell 500. In the example shown, channel 502 is used for resin infusion, channel 504 is used to create a vacuum between the tooling shells to facilitate resin infusion from channel 502, and channel network 506 is used to maintain a temperature of a material by transferring heat to or from surface 514. Channel network 506 may also be used to provide high heat conditions to an area near surface 514 for heating the materials or curing resin. Openings 510 are provided for each of the channels 502, 504 and 506 to transfer the substances or heat to or from surface 514. Similarly, openings 512, shown at the lower surface 516 of the tooling shell 500, may be coupled to devices such as a resin injector, vacuum chamber, or temperature control unit. It will be appreciated that the number, geometry and functions of the channels 502, 504 and 506 can vary depending on the desired implementation. In addition, while openings 510 and 512 are shown at the upper surface 514 and lower surface 516, respectively, of the 3-D printed tooling shell 500, the openings may extend to different parts of the tooling shell 500. For example, one or more of the openings 512 may be disposed on a side of the tooling shell.

Ordinarily, such complex geometries of tooling shell 500 would not be practical for many materials suitable for molding. Further, many manufacturers of composites lack the equipment necessary to cut and polish metal tools such as Invar, so the services of a tooling specialist may be required, adding to the manufacturers' cost. Further, Invar is one of the most expensive metallic tooling materials and, especially for large parts, the sheer size and weight of the tools makes them difficult to handle. Additional parts including, for example, jigs and fixtures may be needed to add features to blocks of material during a conventional machining process, making the conventional techniques more complex and time consuming. Accordingly, the use of 3-D printing to render a tooling shell having a streamlined, preconfigured geometry with hollow sections for lightweight handling and molding features including integrated channel structures may impart substantial cost savings and provide significant benefits.

Figure 6:
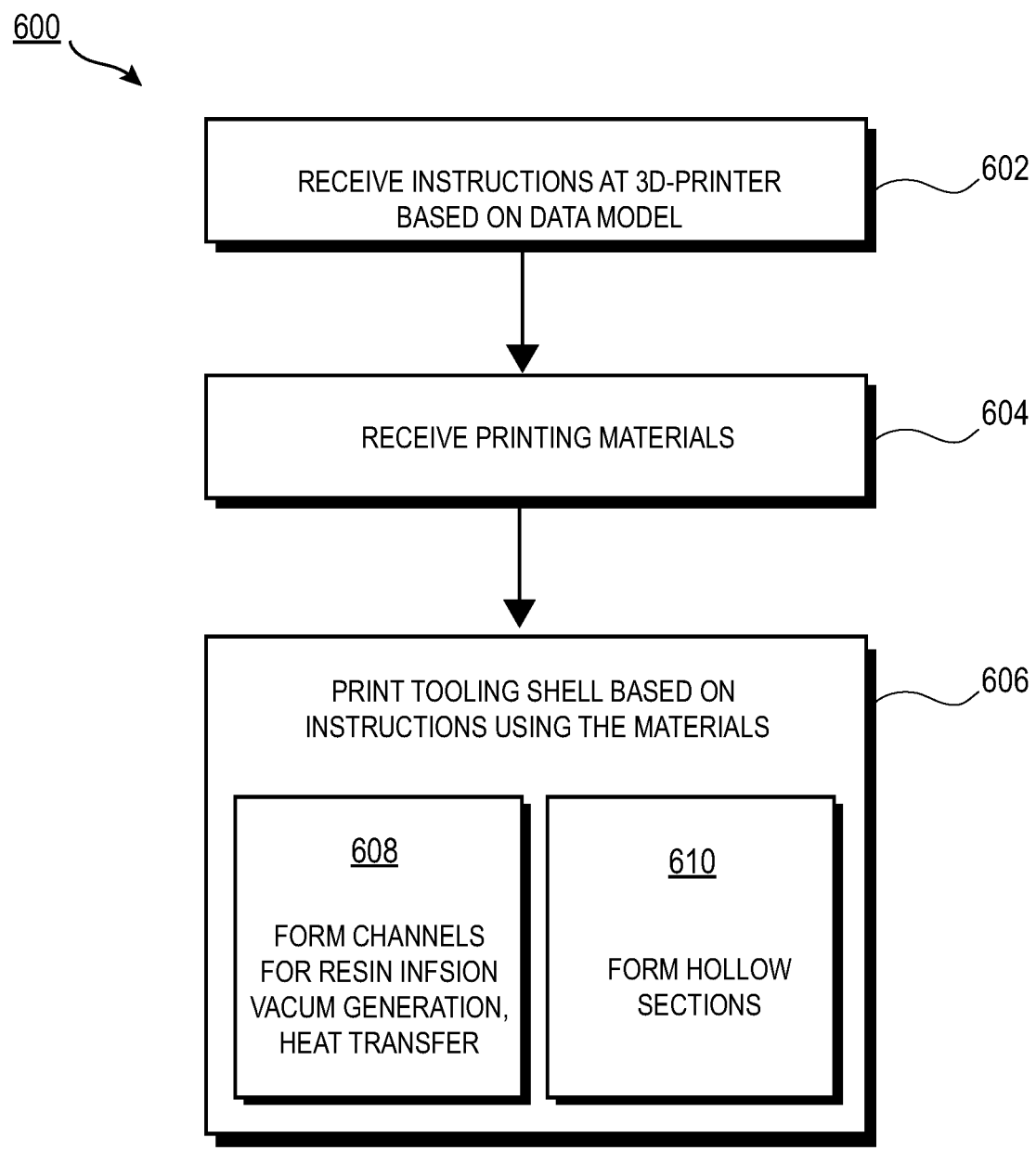
FIG. 6 is a flow diagram illustrating an exemplary process for producing a panel using a 3D-printed tooling shell incorporating hollow structures and integrated channels and for producing a panel therefrom.

FIG. 6 is a flow diagram 600 illustrating an exemplary process for producing a 3D-printed tooling shell incorporating hollow structures and integrated channels. At 602, a 3-D printer receives instructions for printing based on a data model as described in more detail above. In addition, at 604, the 3-D printer receives one or more materials for use in printing the tooling shell, such as the material(s) constituting the tooling shell. In some cases, the required materials may include support materials for use in temporarily providing support to the structure by supporting structure overhangs and providing a temporary fill for the volumes of the hollow sections and/or channels to be formed.

At 606, the tooling shell is 3-D printed using any suitable printing technique. As part of the printing process 606, a sub-step 608 may involve forming a plurality of channels disposed within the structure that will be used for resin infusion, vacuum generation, or heat transfer. Similarly, a sub-step 610 may involve the formation of one or more hollow sections to reduce an overall weight of the tooling shell, while not removing so much material as to compromise the tooling shell's overall structural integrity to perform the task it is designed to perform. At 612, a panel is molded with the tooling shell using any suitable technique, such as those described in this disclosure.

The previous description is provided to enable any person skilled in the art to practice the various aspects described herein. Various modifications to these exemplary embodiments presented throughout this disclosure will be readily apparent to those skilled in the art, and the concepts disclosed herein may be applied to other tooling shells and methods of producing tooling shells. Thus, the claims are not intended to be limited to the exemplary embodiments presented throughout the disclosure, but are to be accorded the full scope consistent with the language claims. All structural and functional equivalents to the elements of the exemplary embodiments described throughout this disclosure that are known or later come to be known to those of ordinary skill in the art are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f), or analogous law in applicable jurisdictions, unless the element is expressly recited using the phrase "means for" or, in the case of a method claim, the element is recited using the phrase "step for."

What is claimed is:

1. An apparatus for producing a composite part for a transport or other mechanical structure, the apparatus comprising:

a three-dimensional (3-D) printed tooling shell comprising a metal alloy, the 3-D printed tooling shell including:

a first surface configured to accept a composite material; and an integrated channel configured to transport a fluid through the first surface of the 3-D printed tooling shell, wherein a volume of the metal alloy of the 3-D printed tooling shell defines a hollow section of the 3-D printed tooling shell.

2. The apparatus of claim 1, wherein the metal alloy includes a nickel alloy.

3. The apparatus of claim 2, wherein the nickel alloy includes Invar.

4. The apparatus of claim 1, wherein the fluid includes a resin.

5. The apparatus of claim 4, wherein the integrated channel is further configured to infuse the composite material with the resin.

6. The apparatus of claim 1, wherein the composite part comprises a composite body panel.

7. The apparatus of claim 1, wherein the composite material includes a carbon fiber composite material.

8. The apparatus of claim 1, wherein the composite material includes pre-impregnated carbon fiber plies.

9. The apparatus of claim 1, wherein the fluid is a gas.

10. The apparatus of claim 1, wherein the integrated channel is further configured to allow the fluid to transfer heat within the 3-D printed tooling shell.

11. The apparatus of claim 1, wherein the integrated channel is further configured to allow a vacuum to be created within the integrated channel.

* * * * *